United States Patent [19]
Gourdol et al.

[11] Patent Number: 6,100,888
[45] Date of Patent: Aug. 8, 2000

[54] ICON OVERRIDE APPARATUS AND METHOD

[75] Inventors: Arnaud Gourdol; Andrew Nicholas, both of Sunnyvale, Calif.

[73] Assignee: Apple Computer, Inc., Cupertino, Calif.

[21] Appl. No.: 09/074,547

[22] Filed: May 8, 1998

[51] Int. Cl.[7] .................................................. G06F 15/40
[52] U.S. Cl. ............................................. 345/348; 345/333
[58] Field of Search .................................. 345/348, 349, 345/326–347, 350–355, 333

[56] References Cited

U.S. PATENT DOCUMENTS

| | | | |
|---|---|---|---|
| 5,062,060 | 10/1991 | Kolnick | 345/339 |
| 5,335,323 | 8/1994 | Kolnick | 345/348 |
| 5,379,366 | 1/1995 | Noyes | 395/54 |
| 5,479,602 | 12/1995 | Baecker . | |
| 5,801,699 | 9/1998 | Hocker et al. | 345/348 |
| 5,802,383 | 9/1998 | Li et al. | 395/800 |
| 5,838,317 | 11/1998 | Bolnick et al. | 345/339 |

*Primary Examiner*—Steven Sax
*Attorney, Agent, or Firm*—Burns, Doane, Swecker & Mathis, LLP

[57] ABSTRACT

A method and apparatus for generating composite icon images for a foreground icon and background icon is disclosed. An icon reference tag is used to retrieve icon image data and icon mask data for each icon. An icon override mechanism allows replacement of a particular icon for a particular application or document with another icon, to facilitate changes in the appearances of a graphical user interface.

7 Claims, 5 Drawing Sheets

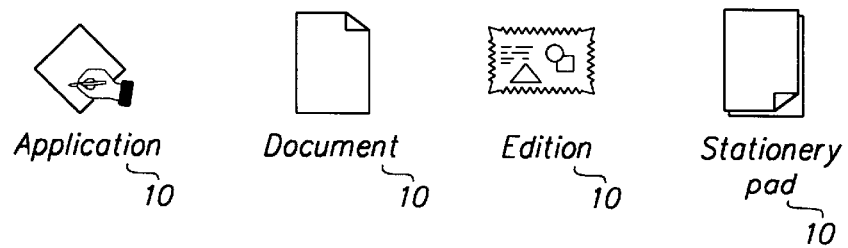
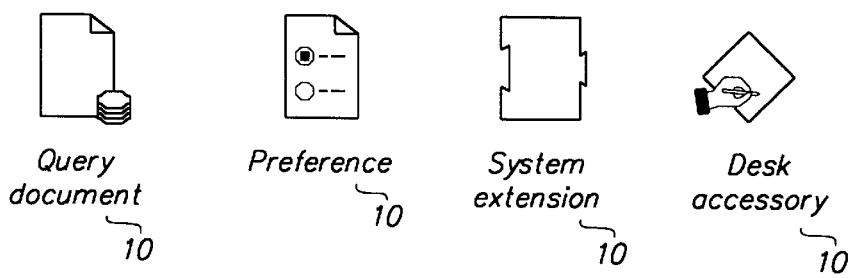
FIG. 2
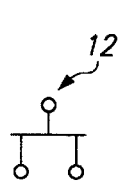
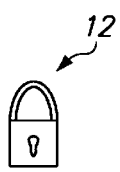
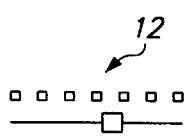
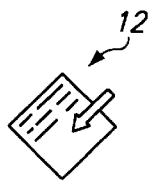
FIG. 3A    FIG. 3B    FIG. 3C    FIG. 3D
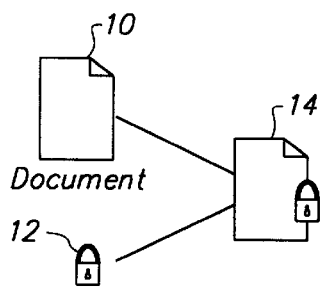
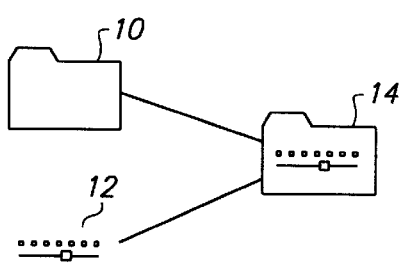
FIG. 4A      FIG. 4B

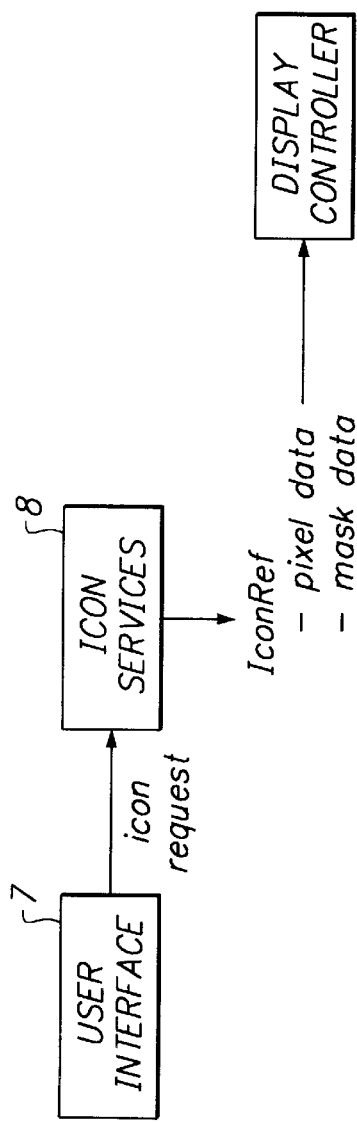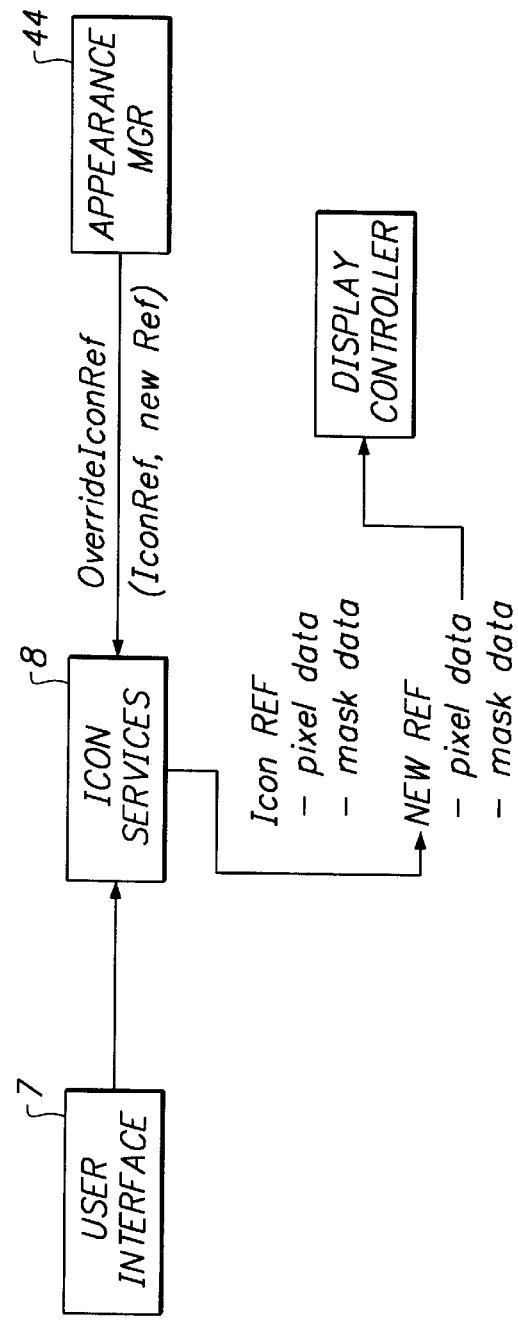

ICON OVERRIDE APPARATUS AND METHOD

BACKGROUND OF THE INVENTION

1. Field of the Invention

The present invention is directed to icons and similar types of graphical objects that are employed in a graphical user interfaces for computers, and more specifically to a method and apparatus which is able to substitute icon images for one another in order to change the appearance of a graphical user interface.

2. Description of the Related Art

Conventional graphical user interfaces make extensive use of icons within a computer display system. Graphical icons used on display screens in computer systems can represent disks, documents and other computer applications selected by a user, in order to utilize the element(s) represented by the graphical icon. Besides accessing computer applications and documents, icons can be manually manipulated by a user to perform tasks easily. For example, an icon representing a word processing document can be selected by a mouse that is manipulated by a user, and be either placed onto another icon representing a word processing application or placed onto an icon of a printer which represents a printing application. Once placed on the printer icon or word processor icon, the document is printed or opened by the word processor, respectively.

To permit users to personalize the graphical user interface, some conventional systems enable the user to both create and modify graphical icons for a variety of purposes. For example, facial features such as hair color, skin color and hair style of an icon image representing a human face can be edited.

Many different icons can be employed within a computer system to graphically represent the presence of different applications and documents. Many of these icons are only changed slightly with respect to their appearance. An icon image can also change depending upon the status of the document or how the document is currently being employed with the computer system. For example, a document may have one icon image when it is not being used, and another slightly different icon that represents an alias of the same document. Also, a document may have been "locked" by a user, may be currently accessible on a network, or may be in use on the network by another user. Currently, software programmers, when developing the user interface, must utilize valuable time and resources in order to design individual icons for each of the situations that could arise in the operation of the computer system.

Another situation which requires the allocation of resources is a change in the icon image after the original icons have been stored in a computer system. For instance, user interfaces have been proposed which permit the user to switch between different appearances, or themes. Each theme can have its own design for various objects such as windows, menus and icons. For example, the graphical icon images used in a system for a child might differ from those for an adult, or the graphical icon images used in a system for a business might differ from those for a non-business use. Another theme could involve showing each icon as a 3-dimensional image rather than a 2-dimensional image. When performing a change between different themes, the graphical user interface must determine the new icon image that is required by the switch in themes, and thereafter retrieve and display the icon image for the new theme. This could require an appreciable amount of processing and occupy time that the processor could be using to perform other tasks. Therefore, the icons need to be able to be quickly referenced and displayed even if a theme change, with respect to all icons, has taken place.

Many icons representing the different attributes of applications and documents can be required in order for a computer to properly depict, through icons, system status. The time consuming labor required to create such icons increases the cost of the system. Also, memory is consumed by the storage of icon image data, some of which are rarely used. Therefore, the need exists to reduce the amount of design effort and memory storage involved with icons while maintaining or increasing the ability for icons to accurately represent documents, applications, etc. Also, a need exists to reduce the amount of processing time allocated to changing icon images from one representation to another.

SUMMARY OF THE INVENTION

The present invention is directed to a method and associated apparatus for efficiently combining a background icon image with an icon badge representing a foreground image to reduce system programming requirements and decrease the amount of memory required to store icon data. To this end, the present invention generates and stores a new icon that is a composite icon, (i.e., combination of two or more icons presently stored in the computer system).

The present invention uses a library of icons with associated icon reference tags. When needed, the icons are retrieved for display on a computer monitor. Each icon reference tag includes icon image data and icon mask data which are used to generate a composite icon. The image data and mask data of at least two icons are retrieved from memory via the associated reference tags and designated as either a foreground icon (an icon badge) or a background icon (a base icon). To formulate the composite image, a logical operation is performed on the icon image data and the icon mask data of both the foreground and background icons. The data that results from the logical operation is stored and associated with a new icon reference tag, to provide a composite data icon that can be displayed. Once the composite icon is generated and the corresponding icon data and mask data is stored, the composite icon can be used to generate yet another composite icon.

In another exemplary embodiment, custom icon images can be employed to generate a composite icon. When an icon is retrieved for display, the operating system determines whether a custom icon badge is associated with the retrieved image. If a custom icon badge image is associated with the stored icon image, the icon image data and icon mask data associated with the icon badge image are retrieved. A composite icon image representing the icon and the custom icon badge is then generated in accordance with logical operations described above, and displayed. If a custom badge is not associated with the retrieved icon, normal processing continues and the icon is displayed in its original form.

In another exemplary embodiment of the present invention, an icon override mechanism is presented. Image data and mask data associated with a plurality of icons are stored in memory. Each of the icons is associated with an icon reference tag, as discussed above, which is indicative of the location of the image and mask data. When an icon is overridden by the system or a user, an override icon reference tag is generated and stored in memory. Each override icon reference tag has the icon reference tag associated with the overridden icon and the new icon. When a request for an icon occurs, if the icon override tag is associated with the requested icon, a new icon reference is substituted for the requested icon reference.

BRIEF DESCRIPTION OF THE DRAWINGS

Other objects and advantages of the present invention will become more apparent from the following detailed description of the invention when read in conjunction with the accompanying drawings wherein like elements are designated by like numerals and wherein:

FIG. 2 illustrates exemplary icon images which might be utilized in embodiments of the present invention;

FIG. 3 illustrates exemplary icon badges representative of both system function and attributes that might be used in accordance with exemplary embodiments of the invention;

FIG. 4a illustrates a combination of a base icon image and a locking function icon badge in accordance with an exemplary embodiment of the present invention;

FIG. 4b illustrates a combination of a base icon image and a control attribute icon badge in accordance with an exemplary embodiment of the present invention;

FIG. 5 illustrates the combination of the mask data for the example of FIG. 4a;

FIGS. 8a and 8b illustrate flow charts of the icon override mechanism in accordance with an exemplary embodiment of the present invention.

DETAILED DESCRIPTION OF THE INVENTION

The present invention will now be described with reference to the accompanying drawings in which graphical icon representations are combined and modified, and custom icon badges are generated. However, this invention is not limited to only the embodiments set forth within this disclosure. Rather, the combination and modification of the graphical icon representations as shown in this disclosure is meant to be exemplary of many other graphical elements that can be combined or changed in any manner, for the purpose of saving programming time and system processing time.

Figure 1:
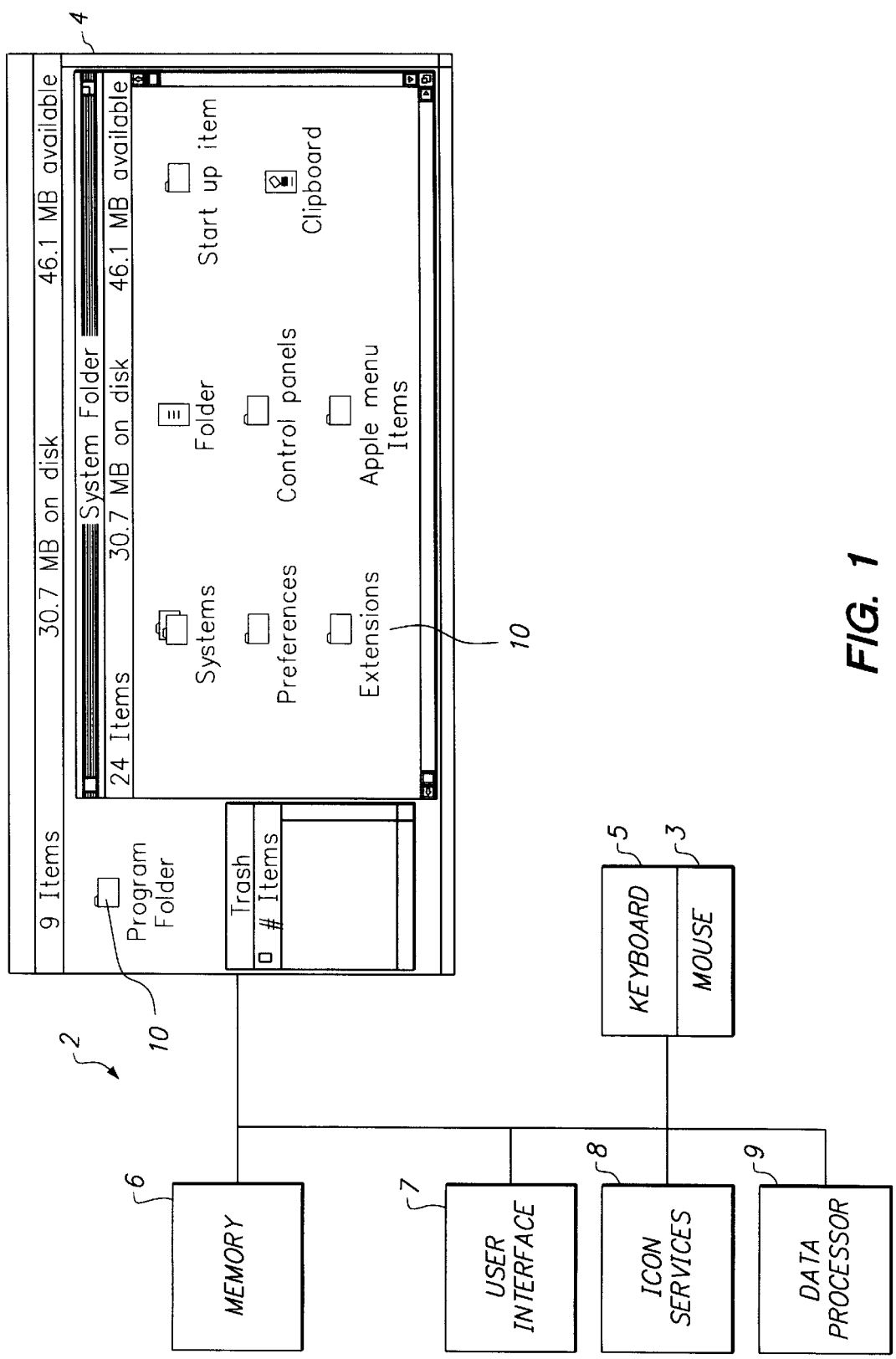
FIG. 1 illustrates a computer system of a type in which exemplary embodiments of the present invention can be implemented.

Referring to FIG. 1, a general computer system 2, in which the present invention can be implemented, is illustrated. Computer system 2 comprises a display device 4 and various input devices such as a keyboard 5 and mouse 3 in operable connection with a memory 6 and data processor 9. While other elements and components are normally attached to the computer only these elements are shown so as not to obscure the invention. The computer system 2 runs many different applications and other programs such as a word processing programs, accounting programs, and e-mail programs, to name a few. Two specific portions of the operating system running on the system illustrated in FIG. 1 are the user interface application 7 and icon services application 8, respectively. As with the other software programs, these applications are typically stored in a computer-readable medium, such as a magnetic disk, and loaded into the memory of the computer for execution.

The user interface application 7 functions to display the desktop shown in the display device 4 and launches other programs at the request of the user. Icon services 8 is an application that maintains and retrieves icon image data and prepares the data for presentation on display 4. With the development of graphical user interface (GUI) systems, computer programs and applications have continuously made efforts to be easily accessible to a user of a computer. In furtherance of such developments, icons 10 have been developed which can represent disks, documents and other computer applications. A user is able, through the manipulation of a mouse 3, to access a program by simply clicking on the icon which is displayed on the computer display that represents the program.

FIG. 2 illustrates exemplary base icon images 10 that might be used in display devices of computer systems. Base icons 10 are shown which represent, an application program, a document, an edition, a stationary pad, a query document, a preference item, an operating system extension and a desk accessory program.

Icon badges 12 are illustrated in FIG. 3 in accordance with exemplary embodiments of the invention. In system operation, a computer application or document represented by an icon 10, shown in FIG. 2, can have a particular status, such as being on a network, or locked, as shown in FIGS. 3(a) and 3(b). Alternatively, badges can represent a particular attribute, such as a control panel or an alias to a file. The icon badges 12 can be "attached" to the base icons 10 in order to indicate, to a user, that the document or application represented by the icon has the attributes or maintains the status represented by the image of the icon badge 12. Many other attributes or status elements could be used as icon badges. For example, icons representing a connection to a shared folder and a script, not illustrated here, could also be employed within exemplary embodiments of the present invention.

As illustrated in FIG. 4a, a representation of a document that is locked can be a composite icon 14 made from a base icon 10, (e.g., the icon which forms the background of the composite icon) that represents the document and an icon badge 12 (i.e., the icon located in the foreground of composite icon) that represents the lock. Also, a basic folder icon 10 can be combined with another icon badge 12, representative of a control panel, in order to create a combined icon also shown in FIG. 4b. Many icon badges can be combined with many base icons in order to efficiently create new icons without requiring programmer input time to design each new icon.

Each base icon 10 and icon badge 12 is referenced in memory via an icon reference tag. The icon reference tag is a unique number or alpha-numeric tag that the user interface 7 utilizes to find and display an icon image. In normal system operation, the user interface 7 issues a request to icon services 8 to retrieve an icon and prepare it for display. The request contains the icon reference tag which is used by the icon services 8 to seek and find the requested image data for display.

Each icon reference tag has two data files associated with it. First, each icon has pixel data which represents the image of the icon. For instance the icon could have an image area which is 32 pixels wide by 32 pixels high, and each pixel can be represented by an 8-bit color value. Each icon reference tag also references icon mask data for each icon. The icon mask data is a binary representation of the icon image which identifies the portions of an icon that should be displayed.

Figure 5:
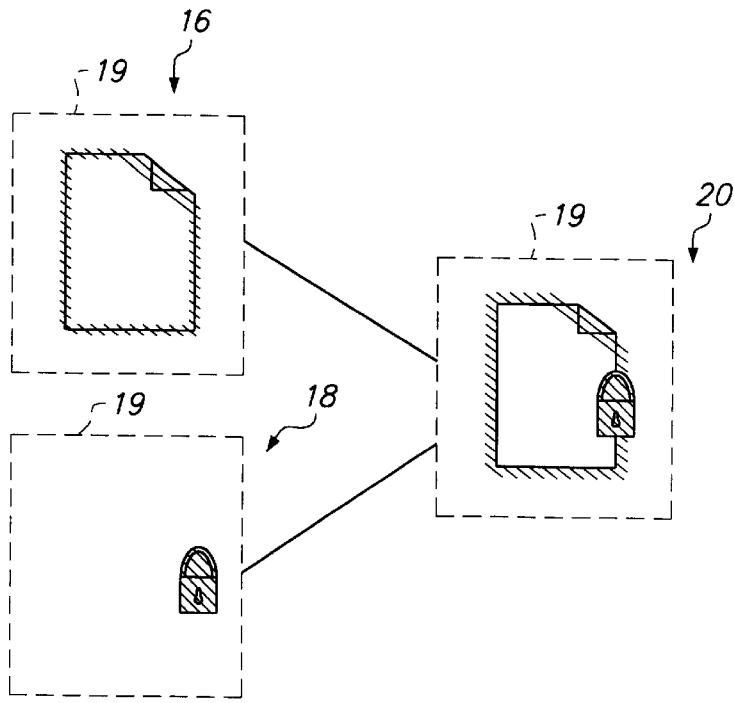

As illustrated in FIG. 5, the top icon image is representative of the mask data of one icon that might form a base icon 16, while the bottom icon image is representative of the mask data of another icon which could represent a badge 18. The dashed lines 19 surrounding each icon image represent the border of the 32-by-32 pixel array which defines the icon. Most of the area of the image, except for the masked portions of the icons, are transparent to the user. The hatched area of each icon is representative of areas of the icon which are considered to be significant within the overall 32×32 pixel area of the icon. In a binary representation such as the one described, the hatched areas are one of the binary values (e.g. one) while the other areas of the image are the remaining value (zero). As illustrated in FIG. 5, when these two icons are combined to form a composite icon, such as a badged icon, the mask data of each icon is combined to form the mask data for the new composite icon 20. In order to create the mask data for the composite icon 20, the mask data of the base icon 16 and the icon badge 18 are combined by means of a logical OR operation.

Next, the image pixel data for the composite icon image is generated. When generating this data, the user determines which icon is the background icon and which icon is the foreground icon. The foreground icon will be superimposed on the background icon in an manner which obstructs any image behind the masked areas of the foreground icon. As discussed above, for purposes of this invention, the base icon is deemed be the background icon and the icon badge is deemed to be the foreground icon. With respect to the icon pixel data shown in FIGS. 4a and 4b, for example, the pixel image data of the badge icon (foreground icon) and the mask image data of the badge icon are logically AND'ed together, and then logically OR'ed with the picture data of the base icon (background icon) 10. A new data structure and icon reference tag is created for each composite icon and stored in the memory 6 of the computer system 2.

This procedure for combining two icons to form a new composite icon can be summarized in the following two equations. In this example, the background icon is identified as A, the foreground icon is identified as B, and the new composite icon is identified as C. The pixel data for an icon, e.g. icon A, is represented as $pic_A$, and the mask data for the icon is represented as $mask_A$. The mask and pixel data for the composite icon C is determined as follows:

$$mask_C = mask_A \text{ OR } mask_B$$

$$pict_C = (pict_B \text{ AND } mask_B) \text{ OR } pict_A$$

where:
OR represents a logical OR operation, i.e. the union of data, and
AND represents a logical AND operation, i.e. the intersection of data.

Figure 6A:
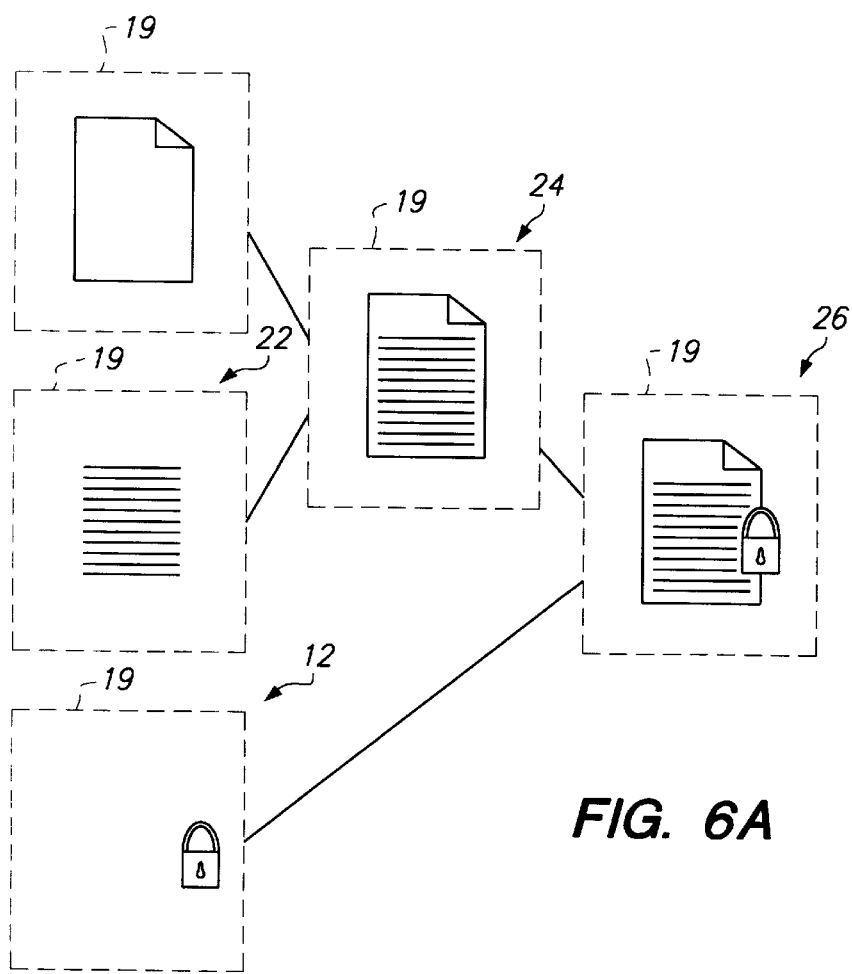
FIG. 6a illustrates a combination of the image of a document icon, a writing icon badge and a locking icon badge in accordance with an exemplary embodiment of the present invention.
Figure 6B:
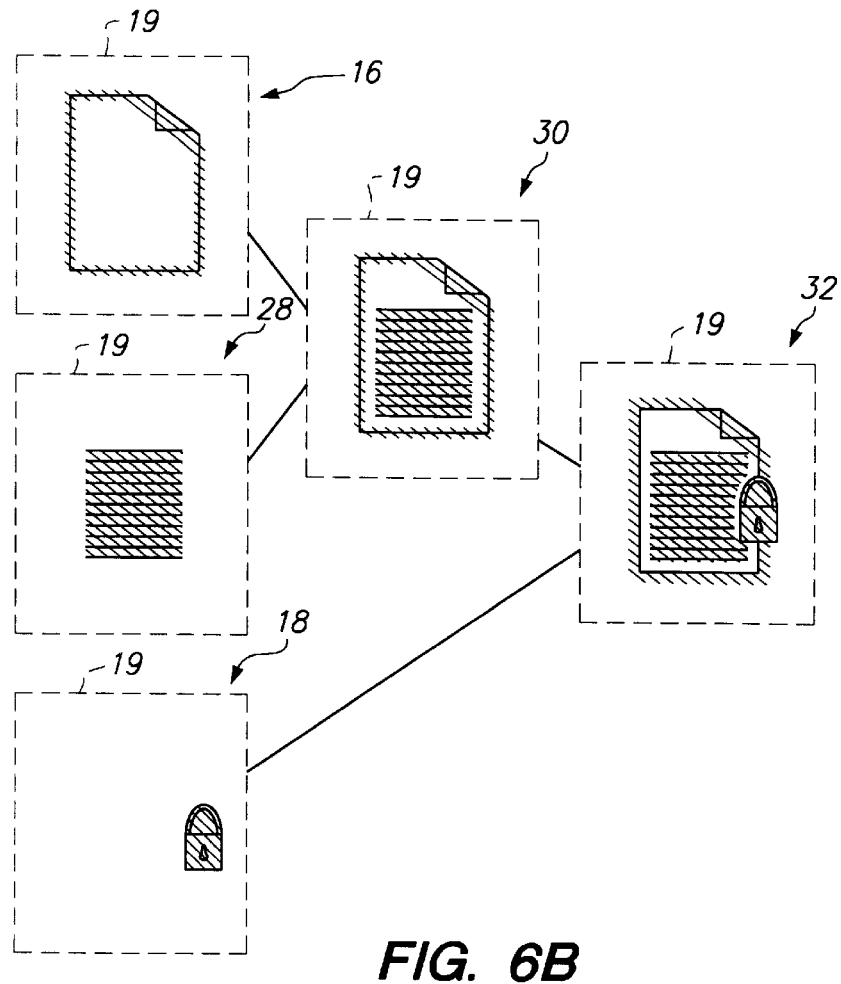
FIG. 6b illustrates a combination of the mask data of the document icon, a writing icon badge and a locking icon badge in accordance with an exemplary embodiment of the present invention.

A composite icon can be used to form additional composite icons, as illustrated in FIGS. 6a and 6b. If, for example, a user wanted to represent a document with writing lines located within the outlines of the document icon, a blank document icon 20 could be combined with an icon representing lines of writing 22, to generate a first composite icon 24. The image of the first composite icon 24 is then combined with a locking element icon 12, to generate a second composite icon 26. In this case, the masked portion of the foreground icon 12 obscures some of the picture elements of the underlying background icon 24.

FIG. 6b illustrates how the mask data would be combined in this example. When generating the first composite icon 30, there is no overlap of mask data, so the foreground mask and subsequent image, discussed above, of the writing is embedded in the document icon image. Next, an icon image of a lock 18 is placed on the already combined icon 30. In this case, the composite icon 30 constitutes the background icon and the icon badge representing the lock 18 is chosen as the foreground. The mask data of the two images overlap as shown in the second composite image 32. Since, the lock image is in the foreground, the data representing the lines of writing would be obstructed when displayed.

For any composite icon, it is possible to determine the original icons that went into its composition, by reference to the equations given above. Thus, for example, if a user desires to change the lines of writing on the composite icon 26 shown in FIG. 6A, it is possible to determine the original icon 22 that was employed to provide that portion of the image, and then substitute a new icon to produce the desired variation.

The ability to combine multiple icons to form a composite icon offers a great deal of flexibility in user interfaces where the appearance of icons may be changed. For instance, in a user interface which permits the user to switch between different themes, one theme may employ a two-dimensional image of a folder while another theme may present a three-dimensional view. The present invention eliminates the need to redesign each different type of badged icon for a new theme. Rather, only the base folder icon needs to be switched, and the same badge can be applied to either the two-dimensional folder image or the three-dimensional folder image.

Figure 7:
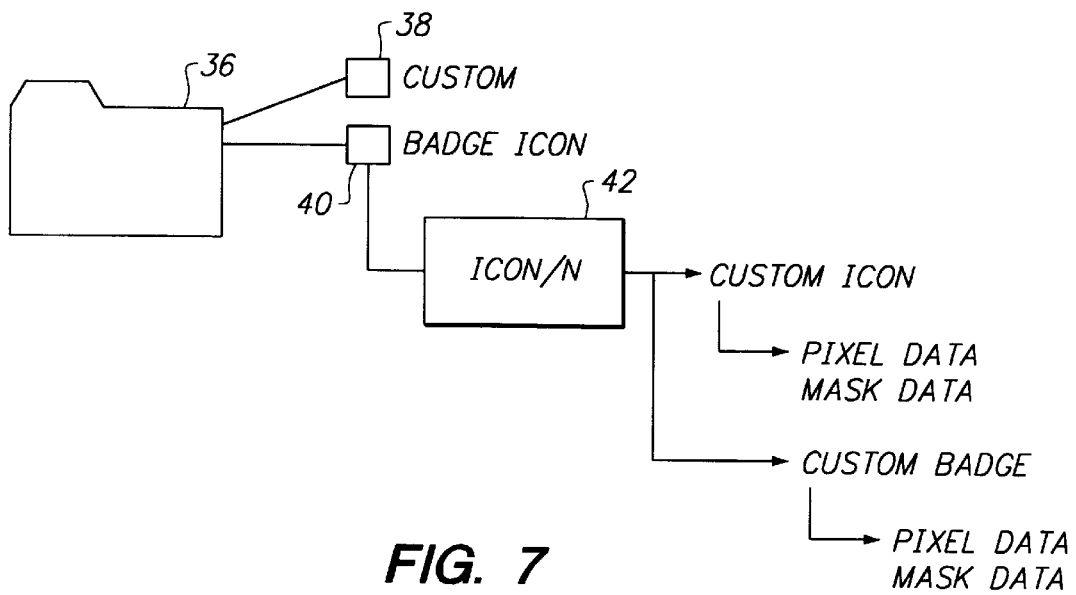
FIG. 7 illustrates the use of the custom icon and badge icon in accordance with an exemplary embodiment of the present invention.

In an exemplary embodiment of the invention, this ability to add a badge to any type of base icon is implemented as a complement to the ability to employ custom icons for folders or the like. As illustrated in FIG. 7, each folder icon 36 can have a pair of data bits 38 and 40 associated with the image data to determine whether there is a custom icon or a designated badge. As discussed previously, at the request of the user interface 7, icon services 8 retrieves data with respect to a particular icon reference tag and performs the processing in order for the icon to be displayed on the monitor. As part of this processing, icon services 8 determines whether either of the two bits are enabled. If either or both of the icon bits 38 and 40 are enabled, the icon services looks for a custom file 42 in the folder. The custom file 42, labeled "Icon/n" in FIG. 7 is invisible to the user and contains custom icon data and/or badge data.

If the custom bit 38 is enabled, custom icon data is obtained from the custom file 42 and used as the image for the folder in place of the normal folder image. The custom icon data does not have to be stored within the folder. Instead the folder can have pointers which enable the computer to locate the data in another storage area. In some situations, it may not be desirable to replace the entire image of the icon with a custom icon. For instance, in the above-described example of theme switching, if all folders are switched to a three-dimensional view, a custom icon might look out of place. In this situation, therefore, only the badge bit 40 is set. This allows a user's designated icon badge to always be displayed on the folder icon when displayed, regardless of the image of the folder. The custom badge specifies only that portion of the image which is different, i.e. the foreground image. The base folder icon 36 remains the same. Thus, if a system theme were changed to alter all of the system icons, the altered icon would still have, as its badge, the designated representation stored in the file "Icon/n."

In another aspect of the invention, an icon override mechanism is provided which enables a system to have a smooth and efficient transition between multiple icon representations. An external user can decide, for example, to replace an icon in the system 2 with a new, preferred icon. For example, a particular user could desire that the icon representing a folder be replaced with an icon representing a diamond. To ensure that every time the user interface requests the folder icon, the new icon representing the diamond is instead displayed, an override icon reference tag is employed.

With reference to FIG. 8A, when a particular icon is to be displayed on the desktop, the user interface application 7 issues a request to the icon services application 8 to draw a particular icon, e.g. a folder. In response, the icon services application obtains the icon reference tag for that type of icon, and forwards the picture data for the icon to a display controller, to cause the image to be displayed at the position designated by the user interface application.

In a situation such as theme switching, it is desirable to replace the default icon image with a new image. In the context of the invention, this is carried out by means of an override command that is issued from an external client to the icon services application 8. The external client could be, for example, an appearance manager application 44 which is responsible for theme switching, the user, or any other software program which is granted control over the appearance of objects in the user interface.

When an icon image is to be overridden, the external client 44 sends a request to the icon services application 8, asking for the icon reference tag of each type of icon which is to be changed, e.g. folder, document, etc. In return, the icon services application 8 provides the icon reference tag for the requested type of icon. The external client then issues a command which can have the form OverrideIconRef (IconRef, new IconRef). This command instructs the icon services application 8 to substitute the new icon reference tag for the original icon reference tag for that type of icon. The icon services application 8 might do this, for example, by creating a table which associates each icon reference tag with the new icon reference tag, and setting a bit to indicate which icon references have been overridden. Thereafter, when the user interface requests a particular type of icon, the icon services application uses the new icon reference tag to provide the appropriate image data to the display controller.

When a user decides to switch themes, for example, a list is generated of every icon reference tag and associated icon for the first theme which is overridden by the icons of a second theme. For each of these icons, a new override icon reference tag is generated which allows the icon services 8 to directly determine the new icon that must be displayed.

In this situation, however, the original icon information is not lost, so that if the data for the new icon is deleted, the default images are still available for use.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalence thereof are intended to be embraced therein.

What is claimed is:

1. A method for overriding the display of a first icon image with a second icon image, comprising steps of:

storing icon data representative of a plurality of icon images;

associating an icon reference tag with individual icon images;

generating an override icon reference tag relating the icon reference tag of a first icon image to the icon reference tag of a second icon image;

receiving a request for display of said first icon image;

substituting the icon reference tag of the second icon image for the icon reference tag of the first icon image in response to the override icon reference tag; and displaying the entire second icon image in place of the requested first icon image.

2. The method for overriding the display of a first icon with a second icon of claim 1, wherein said image data further comprises icon mask data and icon image data.

3. The method for overriding the display of a first icon with a second icon of claim 1, wherein an override icon reference tag is associated with each of a plurality of icon images in a computer system in response to a command to switch the appearance of a graphical user interface.

4. A computer readable medium containing program instructions to:

store icon data representative of a plurality of icon images;

associate an icon reference tag with individual icon images;

generate an override icon reference tag relating the icon reference tag of a first icon image to the icon reference tag of a second icon image;

receive a request for display of said first icon image;

substitute the icon reference tag of the second icon image for the icon reference tag of the first icon image in response to the override icon reference tag; and display the entire second icon image in place of the requested first icon image.

5. An apparatus for overriding the display of a first icon image with a second icon image, comprising:

icon data memory which contains data representative of a plurality of icon images, and an override icon reference tag relating an icon reference tag of a first icon image to an icon reference tag of a second icon image;

an input device for requesting display of said first icon image;

a processor which is responsive to the presence of an override icon reference tag to substitute the second icon image reference tag for the first icon image reference tag; and a display device which displays the entire second icon image in place of the requested first icon image in response to the substituted icon reference tag.

6. The apparatus for overriding the display of a first icon with a second icon of claim 5, wherein said icon image memory stores icon mask data and icon image data.

7. The apparatus for overriding the display of a first icon with a second icon of claim 5, wherein an override icon reference tag is associated with each of a plurality icon images in a computer system, and said processor substitutes one plurality of icon reference tags for another plurality of icon reference tags in response to a request to change the appearance of a graphical user interface.

* * * * *